United States Patent
Ezell et al.

(10) Patent No.: US 9,473,544 B2
(45) Date of Patent: Oct. 18, 2016

(54) SYSTEM AND METHOD FOR ENABLING HOT-DESKING

(71) Applicant: Avaya Inc., Basking Ridge, NJ (US)

(72) Inventors: Joel M. Ezell, Broomfield, CO (US); Stephen Durney, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 408 days.

(21) Appl. No.: 13/626,232

(22) Filed: Sep. 25, 2012

(65) Prior Publication Data

US 2014/0086396 A1    Mar. 27, 2014

(51) Int. Cl.
*H04M 7/00*     (2006.01)
*H04L 29/06*    (2006.01)
*H04M 3/42*     (2006.01)

(52) U.S. Cl.
CPC ....... *H04L 65/4023* (2013.01); *H04L 65/1053* (2013.01); *H04L 65/1069* (2013.01); *H04L 65/4015* (2013.01); *H04M 3/42272* (2013.01); *H04M 7/00* (2013.01); *H04M 2207/20* (2013.01)

(58) Field of Classification Search
CPC ........... H04L 65/1069; H04L 65/1006; H04L 65/1016; H04L 65/1046; H04L 65/403
See application file for complete search history.

(56) References Cited

U.S. PATENT DOCUMENTS

| | | | | |
|---|---|---|---|---|
| 8,787,533 | B2 * | 7/2014 | MacDonald | H04M 3/42059 379/142.01 |
| 2007/0217418 | A1 * | 9/2007 | Baker | H04L 29/06027 370/392 |
| 2009/0060150 | A1 * | 3/2009 | Amport | H04M 7/122 379/88.17 |
| 2010/0189094 | A1 * | 7/2010 | Gray et al. | 370/352 |
| 2010/0267364 | A1 * | 10/2010 | Smith | H04M 3/42068 455/410 |
| 2014/0052974 | A1 * | 2/2014 | Masters | 713/1 |

FOREIGN PATENT DOCUMENTS

| | | |
|---|---|---|
| CN | 1607799 | 4/2005 |
| CN | 101051993 | 10/2007 |
| KR | 10-2002-0035822 | 5/2002 |
| KR | 10-2005-0082092 | 8/2005 |
| KR | 100706486 | 4/2007 |
| KR | 2011-0011407 | 2/2011 |

OTHER PUBLICATIONS

Official Action with English Translation for Korea Patent Application No. 2013-0075321, dated Jun. 16, 2014 8 pages.
Official Action with English Translation for China Patent Application No. 201310264373.5, dated Sep. 25, 2015 6 pages.
Official Action with English Translation for China Patent Application No. 201310264373.5, dated Jan. 4, 2015 13 pages.
Notice of Allowance with English Translation for South Korea Patent Application No. 10-2013-0075321, dated Dec. 10, 2014 3 pages.

* cited by examiner

*Primary Examiner* — Amal Zenati
(74) *Attorney, Agent, or Firm* — Sheridan Ross P.C.

(57) ABSTRACT

A hot-desking application and methods of operating the same are described. The hot-desking application can be provisioned as an explicit sequenced application for all user addresses of record in addition to being provisioned as an implicit sequenced application for all of the possible hot-desk endpoint addresses. Through such provisioning, the hot-desking application can, among other things, allow for calls to be placed directly from a hot-desk endpoint but still show the user's address of record as the calling identity.

20 Claims, 4 Drawing Sheets

SYSTEM AND METHOD FOR ENABLING HOT-DESKING

FIELD OF THE DISCLOSURE

The present disclosure is generally directed toward communications and more specifically toward communication systems and methods.

BACKGROUND

Most large companies these days have a heterogeneous mix of Private Branch eXchanges (PBXs)/enterprise communication systems. Many of these same companies have a "Hot Desk" environment where employees are allowed to sit at a different desk and a different telephone on occasion, or even each day. These companies would like for their employees to have one single enterprise communication address that can represent that employee for all calls received and made by the employee. These companies would also like for this to be the case regardless of the type and manufacturer of endpoint (e.g., Cisco endpoint, Avaya endpoint, Siemens endpoint, etc.) at which the employee is currently sitting.

Previous attempts to address the above-mentioned problem include: (1) Call Forwarding; (2) Session Initiation Protocol (SIP) "Call me/Call you"; and (3) Internet Protocol (IP) Softphone "Telecommuter" mode. The call forwarding solution simply sends incoming calls to a user's address to their hot-desk number. The SIP "Call me/Call you" can be used to have an application initiate a call from a hot-desk endpoint and make it look to the called party as if he/she was called from the user's address. The IP Softphone "Telecommuter" mode can be used to extend an incoming call to user's address out to the hot-desk number. It can also be used to initiate a call in the "Call me/Call you" paradigm described above.

The available solutions fall short in several ways. First of all, the available solutions do not allow for the user to initiate calls directly from the hot-desk endpoint. Rather, the user must use an application of some sort to initiate a "Call me/Call you" flow so that the far end sees the user's address.

A problem with the IP Softphone solution in particular is that an IP Softphone solution requires the IP Softphone to be running and be registered with a PBX. This softphone application consumes both desktop and PBX resources for the user's address, in addition to those being consumed by the hot-desk endpoint.

A problem with the call forward solution is that the call Forward solution for redirecting incoming calls requires a Computer-Telephone Integration (CTI) link to each of the heterogeneous PBXs. As can be appreciated, these links require time and resources to establish. Another big problem with the call forward solution is that it doesn't address outbound calls.

SUMMARY

It is with respect to the above issues and other problems that the embodiments presented herein were contemplated. In particular, embodiments of the present disclosure propose the ability to, among other things, utilize application sequencing to facilitate a better and more effective hot-desking solution. In some embodiments, every hot-desk user would be an provisioned SIP user of an enterprise communication system, even though they may not have any registered SIP endpoints. In some embodiments, a hot-desking application is provided and can be provisioned as a sequenced application for all user addresses of record. Furthermore, the hot-desking application could also be provisioned as a sequenced application for all of the possible SIP and non-SIP hot-desk endpoint addresses.

In one example operation, when the user sits down at a desk, she would note the address of the endpoint at that desk. In some embodiments, she would then associate that hot-desk address with her own public Address of Record (AOR). This could be done via a Web-based User Interface (UI), a Graphical User Interface (GUI), a Telephone User Interface (TUI), or the like. The system may, in some embodiments, write to a database accessible by the hot-desk sequenced application. Alternatively, the hot-desk association could be coupled with some other sign-in process (e.g., agent login) so that an extra user action is not required to complete the hot-desk association.

In some embodiments, for incoming calls to the user's AOR, all applications for the called user (e.g., termination or term-side sequenced applications provisioned for the called user) would be invoked. In this scenario, the hot-desk application would be the last such sequenced application. Upon receiving the incoming communication-initiating message (e.g., an INVITE message), the hot-desk application would check to see if the user's AOR is associated with a hot-desk address. In this case, it would find such an association, and would proxy the INVITE to the hot-desk address. Everything upstream of the hot-desk application (e.g., all previously sequenced applications) would see the communications as being with a device associated with the user's AOR, but in actuality they would be communicating with the hot-desk endpoint.

In some embodiments, for outgoing calls from the hot-desk endpoint, there are two separate origination sequence vectors. There is a sequence vector associated with the hot-desk address and a second sequence vector associated with the user address. The hot-desk application would typically be the only application in the origination sequence vector for the hot-desk address. When invoked, the application checks to see if there's an association between the hot-desk address and a user AOR. In this case, it would find such an association and would then change the asserted identity (calling number) of the call to correspond to the user's AOR. The user's sequenced applications (e.g., origination or orig. applications) would then be invoked before the call is delivered to the called party. All downstream applications and/or parties would see the call as coming from the user's AOR instead of from the hot-desk number.

In accordance with at least some embodiments, hot-desk users would be instructed to not call another hot-desk user directly (e.g., by dialing the hot-desk number rather than the user's AOR). If this practice is adhered to, all calls can be sequenced and have their identities manipulated. This is true even if the two parties (e.g., called and calling party) are using hot-desk endpoints on the same PBX.

In accordance with at least some embodiments of the present disclosure, a method is provided which generally comprises:

receiving a first message, the first message comprising an asserted identity that corresponds to a hot-desk number;

determining that the hot-desk number has been associated with a calling user's address of record; and in response to determining that the hot-desk number has been associated with the calling user's address of record, changing the asserted identity of the first message to a non-hot-desk number associated with the calling user's address of record.

In accordance with at least some embodiments of the present disclosure, another method is provided which generally comprises:

receiving a first message, the first message comprising a Request Uniform Resource Identifier (R-URI) that comprises a non-hot-desk number which is associated with an address of record for a called user;

determining that the called user's address of record is also associated with a hot-desk number; and in response to determining that the called user's address of record is associated with the hot-desk number, changing the R-URI to the hot-desk number.

The term "server" as used herein should be understood to include any server, collection of servers, processors within a server, blades within a server, one or more virtual machines being executed by a server, containers or processes being executed by a server, etc. In other words, "servers" are not necessarily limited to individual hardware components with dedicated processors and memory. "Servers" are also not limited to a particular type of container executed by a server, such as a J2EE server or any other version of a Java EE server. Non-limiting examples of containers that may be executed by or constitute a server include application containers (e.g., Java Virtual Machines), applet containers (e.g., web browsers or applet viewers), Enterprise JavaBeans (EJB) containers, web containers, Application Programming Interfaces (APIs), and the like.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
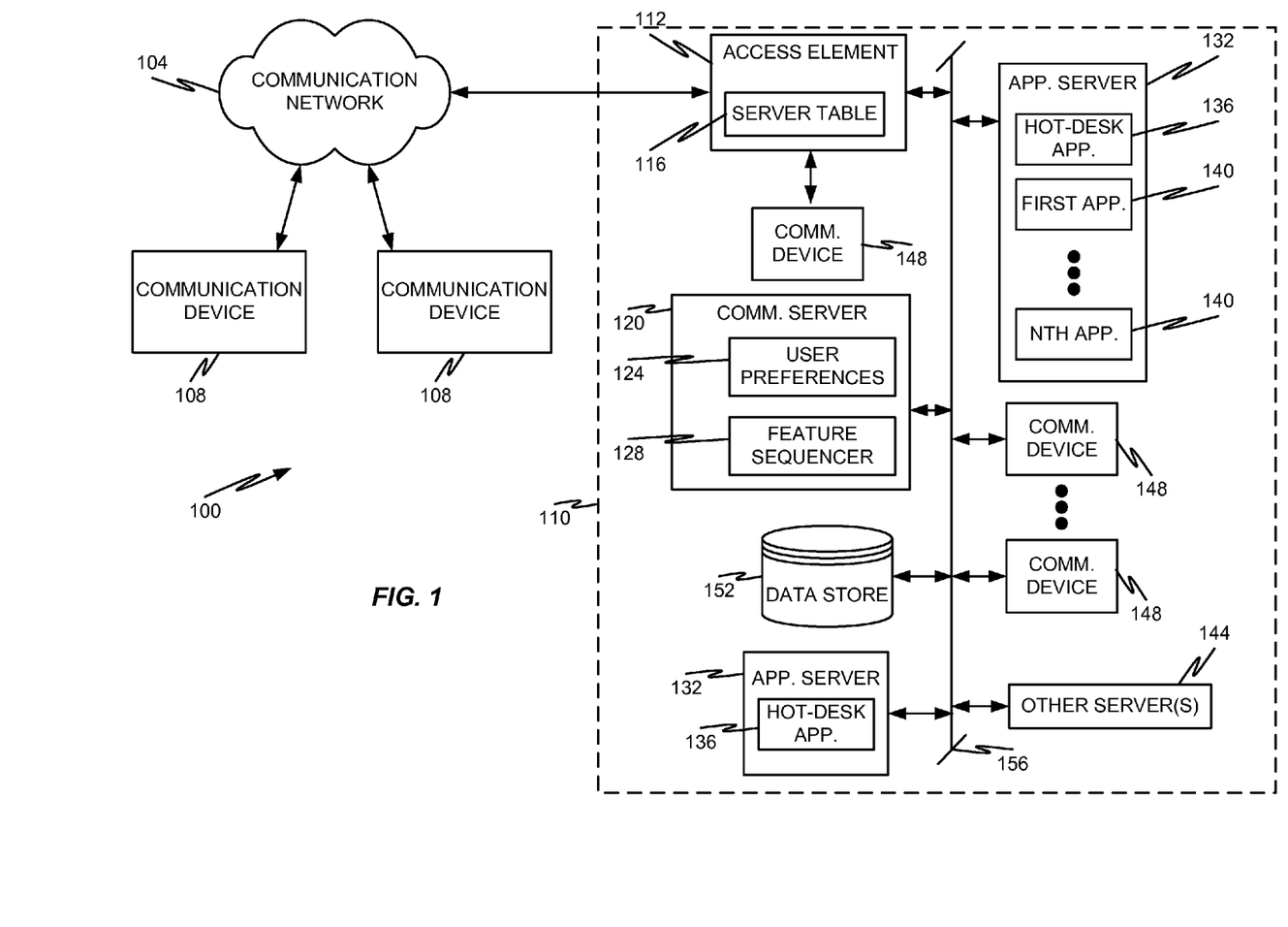
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises one or more communication networks 104 that facilitate communications between communication devices 108, 148.

The communication network 104 may be packet-switched and/or circuit-switched. An illustrative communication network 104 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 104 is a public network supporting the TCP/IP suite of protocols. Communications supported by the communication network 104 include real-time, near-real-time, and non-real-time communications. For instance, the communication network 104 may support voice, video, text, web conferencing, or any combination of media.

In some embodiments, the communication network 104 may connect one or more external communication devices 108 with an enterprise communication network 110. The external communication devices 108 may be considered "external" because they are not fully administered by the entity or group of entities that administers the enterprise network 110. In some embodiments, however, the communication devices 108 may be operated by enterprise users and may be partially administered in accordance with communication rules within the enterprise network 110.

In some embodiments, the enterprise network 110 corresponds to a communication network or set of communication networks that are owned and operated by a single entity. The enterprise network 110, in some embodiments, may be distributed (e.g., a WAN) or it may be confined to a single location (e.g., a LAN). In other embodiments, multiple entities may share some or all of the components of the enterprise network 110.

In the illustrated embodiment, the enterprise network 110 is shown to include an access element having a server table 116, a communication server 120, one or more application servers 132 capable of providing one or multiple communication features to users, one or more internal communication devices 148, a data store 152, and one or multiple other servers 144. Some or all of the components of the enterprise network 110 may be interconnected by a (trusted or secure or private) Local Area Network (LAN) 156.

It should be appreciated that some or all of the functions depicted in FIG. 1 may be co-hosted and/or co-resident on a single server. The depiction of components in FIG. 1 and the other figures provided herein are generally intended to be a logical depiction of the components of the system 100. It should be appreciated that an enterprise network or multiple enterprise networks may comprise multiple LANs 156 connected via a WAN, such as the communication network 104. A single enterprise communication network 110 is depicted in FIG. 1 and described herein for ease of understanding and simplicity and in no way is intended to limit embodiments of the present invention to a single enterprise network 110.

Furthermore, it should be appreciated that while a single access element 112 is depicted, most larger enterprise networks 110 comprise multiple access elements 112, which may or may not be of the same type. For example, a single enterprise network 110 may comprise a first access element 112 from a first vendor (e.g., an access element from Cisco) and a second access element 112 from a second vendor (e.g., an access element from Avaya). In accordance with at least some embodiments, the access element 112 corresponds to a PBX, multiple PBXs, or components within a PBX. More specifically, the access element 112 may provide network access capabilities similar to those provided by known PBX devices or PBX devices yet to be developed. Even more specifically, the access element 112 may be configured to make connections among the internal components of the enterprise network 110 and also connect them to the communication network 104 via trunk lines, for example.

The LAN 156 can be secured from intrusion by untrusted parties by a gateway and/or firewall located between the LAN 156 and communication network 104. In some embodiments, the access element 112 may include the functionality of the gateway and/or firewall. In some embodiments, a separate gateway or firewall may be provided between the access element 112 and the communication network 104.

Although only certain numbers of each server (e.g., a single access element 112, a single communications server 120, two application servers 132, etc.) is depicted in FIG. 1, one, two, three, four, or more instances of any server type may be provided in a single enterprise network 110 or across multiple separate LANs 156 owned and operated by a single enterprise, but separated by communication network 104. In configurations where an enterprise or an enterprise network 110 includes two or more servers of a single type (e.g., multiple communication servers 120), each server may comprise similar functionality, but may be provisioned for providing its features to only a subset of all enterprise users. In particular, as a non-limiting example, a first communications server 120 may be authoritative for and service a first subset of enterprise users whereas a second communications server 120 may be authoritative for and service a second subset of enterprise users, where the first and second subsets of users generally do not share a common user. This is one reason why the access element 112 may be provided with a server table 116—the server table 116 may comprise the information that maps a user to their authoritative communication server 120.

Additionally, multiple servers can support a common user community. For example, in geo-redundant and other applications where users aren't necessarily bound to a single application server, there may be a cluster of equivalent servers where a user can be serviced by any server in the cluster.

The communications server 120 can be included in the access element 112 (e.g., be incorporated into PBX functionality). Alternatively, or in addition, the communication server 120 may comprise an enterprise server, components or applications executed within a server, a virtual machine provided by a server, combinations thereof, or other type of telecommunications system switch or server. The communication server 120 is, in some embodiments, configured to enable the execution of telecommunication functions such as the suite of applications and services made available via Avaya Aura™ platform of Avaya, Inc., including Communication Manager™, Avaya Aura Communication Manager™, Avaya IP Office™, Communication Manager Branch™, Session Manager™, MultiVantage Express™, and combinations thereof.

In some embodiments, the access element 112 is responsible for routing communications within the enterprise network 110 to the communications server 120 responsible for servicing a particular user involved in a communication session. For example, if a first enterprise user is being called by an external communication device 108, then the access element 112 may initially receive the inbound call, determine that the call is directed toward the first enterprise user, reference the server table 116 to identify the authoritative communications server 120 for the first enterprise user, and route the inbound call to the authoritative communications server 120. Likewise, communications between internal enterprise users (e.g., internal communication devices 148) may first be serviced by the originating user's authoritative communications server 120 during the origination phase of communications set-up. After the origination phase is complete, the authoritative communications server 120 of the terminating (or called) user may be invoked to complete the termination phase of communications set-up. In some embodiments, the communications server 120 for the originating and terminating user may be the same, but this is not necessarily required. In situations where more than two enterprise users are involved in a communication session, authoritative communications servers 120 for each of the involved users may be employed without departing from the scope of the present invention. Additionally, the authoritative communications servers 120 for each user may be in the same enterprise network 110 or in different enterprise networks 110, which are owned by a common enterprise but are separated by the communication network 104.

Each communications server 120 may include user preferences 124 and a feature sequencer 128. The feature sequencer 128 provides the communication server 120 with the ability to route messages to the appropriate servers within the network 110. Specifically, the feature sequencer 128 may be invoked in response to receiving a request to initiate a communication session (e.g., an INVITE message in a SIP environment, an HTTP GET request, an inbound or outbound phone call, an email message, a Short Message Service (SMS) message, etc.) or a request for some other type of information (e.g., a request for presence information such as via a SUBSCRIBE message, a database query, etc.). Once invoked, the feature sequencer 128 may be configured to refer to the user preferences 124 to determine which server is to be activated next (e.g., receive the message next). More specifically, the communication server 120 may be configured to establish a chain of Back-to-Back User Agents (B2BUAs) or proxies in at least one of a dialog and media path of a communication session by sequencing each B2BUA into an application sequence one-by-one until the entire application sequence has been constructed.

The user preferences 124 for a communication server 120 contains the feature/communication preferences for each user for which it is authoritative. As one non-limiting example, the user preferences 124 may define which applications 136, 140 from the application server 132 should be invoked for a particular user's application sequence. In some embodiments, the user preferences 124 may be in a table format and may be provisioned by users and/or by administrative personnel. The user preferences 124 for a particular user are referenced by the feature sequencer 128 to determine which, if any, applications 136, 140 should be invoked for the user.

The applications 140 that can be included in a particular application sequence (e.g., via the communication server 120 and application server 132) are generally included to accommodate the user's preferences 124 and to provide communication services in accordance therewith. Applications 140 may vary according to media-type, function, and the like. Illustrative types of applications 140 include, without limitation, a fixed mobile convergence application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

The hot-desk application 136 corresponds to a specific type of application 140 that enables hot-desking for users within the enterprise 110. More specifically, the hot-desk application 136 may be configured to analyze messages transmitted during a communication session or during setup of a communication session to determine: (1) if the message is received from a hot-desk number, (2) if the message is received from a user that has associated themselves and their AOR with a hot-desk number, (3) if the message is directed toward a hot-desk number, and/or (4) if the message is directed toward a user that has associated themselves and their AOR with a hot-desk number. As will be discussed in further detail herein, if the hot-desk application receives a message that meets one of the above criteria, the hot-desk application may be configured to alter one or more of the message's To value, Request Uniform Resource Identifier (R-URI), From header, Contact header, and P-Asserted-Identity (PAI) prior to forwarding the message to the next destination. The alteration of the message may occur within one or more message headers or in any other way allowed/defined by applicable standards and protocols.

The internal communication devices 148 can be similar or identical to the external communication devices 108 except the internal communication devices 148 are provisioned, and often owned, by the enterprise administering the network 110. As can be seen in FIG. 1, some internal communication devices 148 may be connected to the access element 112 via the LAN 156 while other internal communication devices 148 (e.g., analog and digital stations) may be connected directly to the access element 112. Illustrative types of communication devices 148 include, without limitation, cellular phones, smartphones, laptops, Personal Computers (PCs), Personal Digital Assistants (PDAs), digital phones, analog phones, and/or any other type of capable phone, softphone or digital telephone. Examples of suitable telephones include the 1600™, 2400™, 4600™, 5400™, 5600™, 9600™, 9620™, 9630™, 9640™, 9640G™, 9650™, 9608™, 9611™, 9621™, 9641™, and Quick Edition™ telephones, IP wireless telephones (such as Avaya Inc.'s IP DECT™ phones), video phones (such as Avaya Inc.'s Videophone™), and softphones such as Avaya Flare™.

The other server(s) 144 may correspond to any other type of server or collection of servers within the network 110. In some embodiments, the other servers 144 may include one or more of voicemail servers, email servers, calendar servers, presence servers, Instant Messaging (IM) servers, backup servers, virtual machines, or the like.

The data store 152 can be configured to include enterprise subscriber information, such as name, job title, electronic address information (e.g., telephone number, email address, instant messaging handle, direct dial extension, and the like), subscriber contact lists (e.g., contact name and electronic address information), other employee records, user preferences 124, and the like. Information contained in the data store 152 can be updated by any of the components within the network 110 (assuming such devices have permissions to do so) and/or made available to one or more of the components within the network 110 via various types of databases, servers, Application Programming Interfaces (APIs), etc.

The various servers and components depicted in FIG. 1 may be implemented separately (i.e., on different servers) or together (i.e., on a single server). In particular, two or more depicted components (e.g., communication server 120 and application server 132) may be implemented on a single server without departing from the scope of the present invention. Thus, a single device may provide the functionality of several components depicted separately in FIG. 1.

Figure 2:
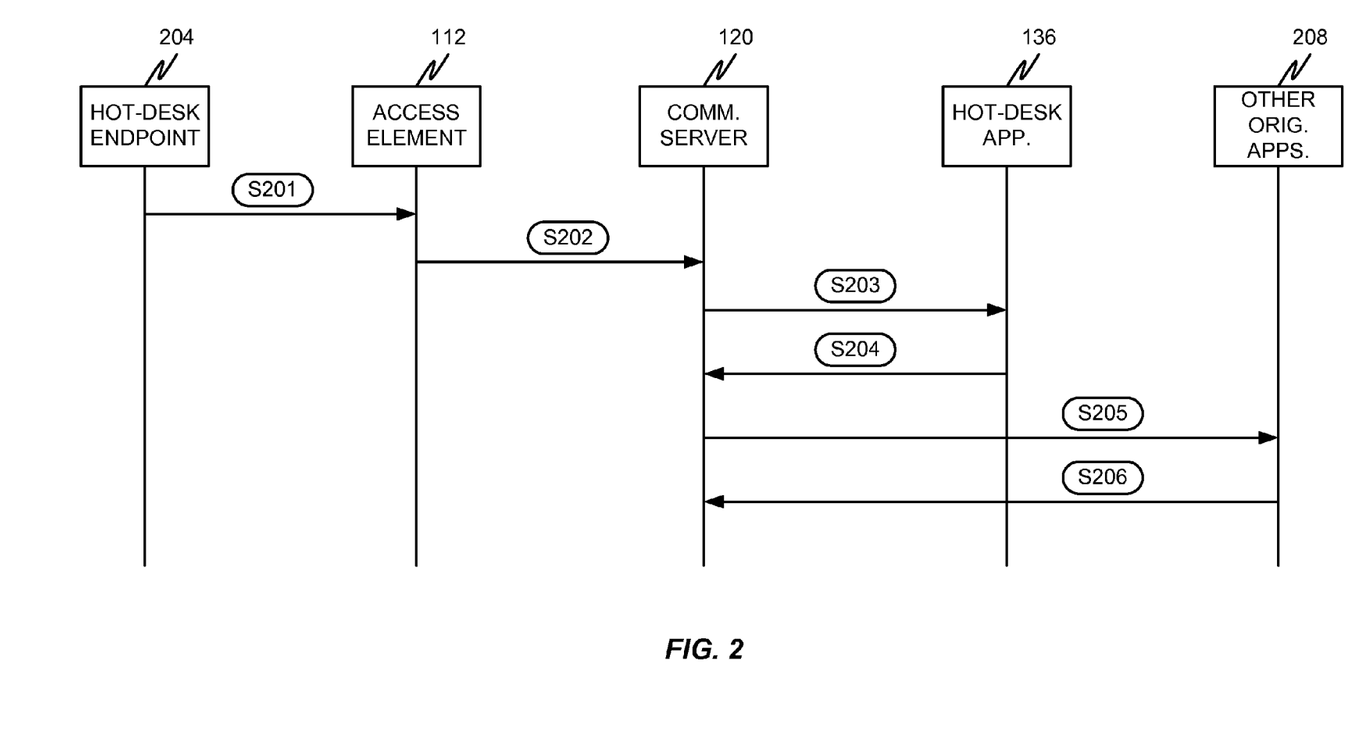
FIG. 2 is a first call flow diagram in accordance with embodiments of the present disclosure.

With reference now to FIG. 2, a call flow and method of processing a call initiated by a user with a hot-desk endpoint 204 will be described in accordance with embodiments of the present disclosure. The hot-desk endpoint 204 may correspond to any communication device 148 that is shared by two or more enterprise users or is made available for temporary use by an enterprise user. In some embodiments, the hot-desk endpoint 204 comprises any type of communication device.

The method begins when a first message is transmitted from the hot-desk endpoint 204 to an access element 112 (step S201). In some embodiments, the first message may correspond to a session-initiating message, such as a SIP INVITE message or variants thereof. In this particular example, the calling user (e.g., Alice) may be initiating a call to a called user (e.g., Bob). While the calling user, Alice, corresponds to an enterprise user, it is not a necessary condition that the called user, Bob, also be an enterprise user. Certain embodiments of the present disclosure, however, contemplate that Alice and Bob may both be enterprise users and both may or may not be utilizing a hot-desk endpoint. It should be noted that if the hot-desk endpoint 204 corresponds to a SIP endpoint, then the first message would not necessarily traverse the access element 112 but rather may be routed directly to the communication server 120, thereby skipping step S201.

In the examples discussed herein, assume that Alice has a first AOR within the enterprise 110 and that first AOR is or has been associated with a first direct-dial number or extension (e.g., administratively associated). More specifically, certain communication systems and system providers enable a direct-dial number to actually be an AOR or vice versa. As an example, a user, such as Alice and Bob, may have an AOR as an alphanumeric AOR (e.g., Alice@enterprise.com), an E.164 AOR (e.g., +1303123456), and/or an enterprise canonical numeric AOR (e.g., 4567). For ease of understanding the example, assume that Alice's AOR is +13031234567. Thus, when other users want to call Alice directly, they dial Alice's AOR (e.g., +13031234567) or some variant thereof (e.g., extension 4567) depending upon the dial-plan assigned to Alice. In this example, assume that Alice has called Bob at +19089353456. This dialed number (e.g., Bob's number) may or may not correspond to a number internal to the enterprise network 110.

Continuing the example of FIG. 2, the access element receives the first message from the hot-desk endpoint 204 and routes the message to the appropriate communication server 120 (step S202). Upon receiving the first message, the communication server 120 determines that the number from which the message was originated (e.g., the number of the hot-desk endpoint 204, which for example may be 444-1234) corresponds to or falls within a number range that is configured to be sequenced to the hot-desk application 136. At this point, the communication server 120 implicitly sequences the hot-desk application 136 by forwarding the message to the hot-desk application 136 (step S203). It should be noted that the communication server 120, in some embodiments, may sequence the hot-desk application 136 as the first application in the sequence of applications for Alice although this may not be necessary since the hot-desk application 136 will have already served its purpose by mapping the hot-desk number to the enterprise AOR.

Thus, when the hot-desk application 136 receives the message from the communication server 120, the hot-desk application 136 determines that the number from which the message was originated (e.g., 444-1234) has been associated with Alice's AOR. In some embodiments, the hot-desk application 136 is made aware of the association between Alice's AOR and the hot-desk number because Alice registered herself (and her AOR) with the hot-desk endpoint 204 when she sat down and started using the hot-desk endpoint 204. Details of this registration process are not described herein and it should be appreciated that any registration process or set of processes may be used. For instance, Alice may enter a TUI code or series of TUI codes at the hot-desk endpoint 204 to register herself and her AOR with the hot-desk endpoint 204. As another example, Alice may use a web-based UI upon sitting down at the hot-desk endpoint 204 to communicate directly with the hot-desk application 136 and register herself and her AOR with the hot-desk endpoint 204. Other registration examples will become readily apparent to those of ordinary skill in the art.

Furthermore, the hot-desk application 136 may be configured to analyze the From, Contact, and/or PAI header of the message to determine if the value contained in the analyzed header (e.g., 444-1234) is actually associated with a user's AOR. Once the hot-desk application 136 determines that the value in the From, Contact, and/or PAI header of the message has been associated with Alice's AOR, the hot-desk application changes the value in the header(s) to correspond to Alice's AOR (e.g., +13031234567). This causes the message to appear as though it was actually originated by Alice at her personal endpoint rather than Alice at the hot-desk endpoint 204.

After the From, Contact, and/or PAI header value has been changed to Alice's direct-dial number or extension, the hot-desk application 136 returns the message back to the communication server 120 (step S204). At this point, the communication server 120 now recognizes the message as being originated by Alice, rather than by hot-desk endpoint 204, and invokes the feature sequencer 128, which refers to Alice's communication preferences in the user preferences 124. Upon looking up Alice's communication preferences, the communication server 120 is enabled to sequence other origination applications 208 for Alice in accordance with her user preferences 124. In particular, the communication server 120 can forward the message along to other origination applications 208 (step S205) and each of the other origination applications 208 can insert themselves into the communication session (e.g., dialog and/or media path) as a B2BUA or proxy, depending upon the nature of the other origination applications 208. In some embodiments, the other origination applications 208 may correspond to various applications 140. After each application has been appropriately sequenced for Alice, the method continues with the last origination application 208 providing the message back to Alice's communication server 120 (step S206) so that the message can be forwarded along to Bob or Bob's communication server 120, depending upon whether Bob is an enterprise user or not.

Figure 3:
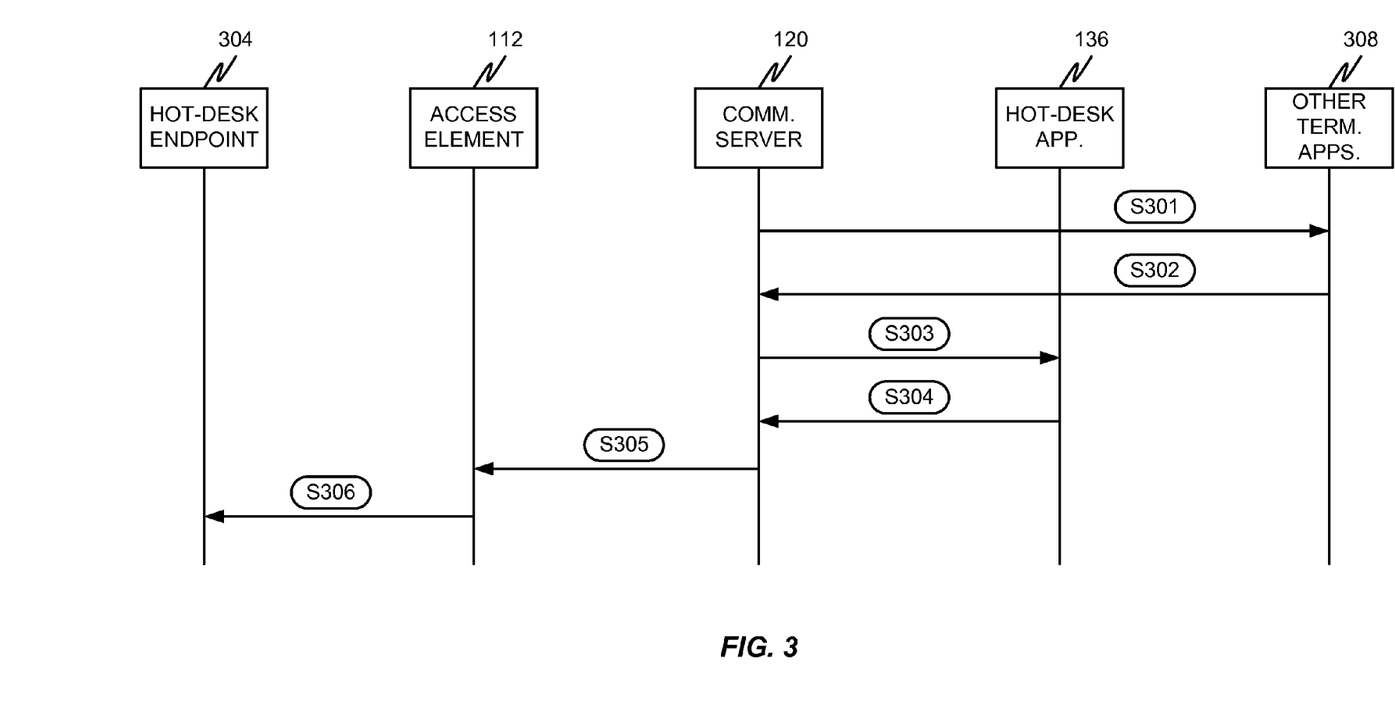
FIG. 3 is a second call flow diagram in accordance with embodiments of the present disclosure.

With reference now to FIG. 3, a call flow and method of processing a call directed toward a user employing a hot-desk endpoint 304 will be described in accordance with embodiments of the present disclosure. The hot-desk endpoint 304 may by similar or identical to the hot-desk endpoint 204 in that it may correspond to any communication device 148 that is shared by two or more enterprise users or is made available for temporary use by an enterprise user.

Furthermore, with respect to the example of FIG. 3, assume that Bob has a second AOR within the enterprise 110 and that second AOR is or has been associated with a second direct-dial number or extension (e.g., administratively associated). For ease of understanding the example, assume that Bob's AOR is +19707654321. Thus, when other users (e.g., Alice) want to call Bob directly, they dial Bob's AOR (+19707654321) or some variant thereof (e.g., extension 4321) depending upon the dial-plan assigned to Bob.

Although the call flow of FIG. 3 is depicted as being separate and distinct from the call flow of FIG. 2, it should be appreciated that the flow of FIG. 3 may, in some embodiments, pick up where the flow of FIG. 2 left off.

Specifically, step S301 may be performed after step S206. It should also be appreciated that the flow of FIG. 3 can be performed independent of the flow depicted in FIG. 2. For instance, the flow of FIG. 3 may be initiated in response to Bob receiving a call from an external communication device 108.

In some embodiments, the call flow for the call to Bob begins with the communication server 120 (e.g., Bob's authoritative communication server) invoking the feature sequencer 128 to determine Bob's communication preferences from the user preferences 124. Once this determination has been made, the communication server 120 invokes the application sequence for Bob via one or more other termination applications 308 (step S301). In some embodiments, the termination applications may correspond to one or more applications 140 that are sequenced as B2BUAs or proxies by the communication server 120 so as to fulfill Bob's communication preferences. The communication server 120 knows that Bob's preferences should be fulfilled because the message is addressed to Bob's AOR or a direct-dial number associated with Bob's AOR. Every time an application is sequenced, the message may be transmitted back to communication server 120 to determine if another termination application is to be sequenced for Bob (step S302). This back-and-forth between the communication server 120 and the other termination applications 308 continues until all of Bob's applications have been sequenced.

Thereafter, the communication server 120 sequences the hot-desk application 136 on behalf of Bob, in-case Bob is sitting at a hot-desk endpoint 304 (step S303). Upon receiving the message, the hot-desk application 136 determines that Bob has associated himself with the hot-desk endpoint 304 having a hot-desk number (e.g., 555-6789). Bob may have associated himself and/or his AOR with the hot-desk endpoint 304 in a registration step that is similar or identical to the registration step discussed above.

When the hot-desk application 136 determines that the received message is associated with Bob and, therefore, also associated with a hot-desk endpoint 304, the hot-desk application 136 is configured to change one or more of: the message's To value and a value of the message's R-URI header from Bob's AOR (e.g., +19707654321) to the hot-desk number (e.g., 555-6789). After the hot-desk application 136 has changed the To value and/or R-URI header of the message, the method continues with the hot-desk application 136 returning the message to the communication server 120 (step S304).

As can be seen above, the hot-desk application 136 may correspond to the last sequenced application for Bob. In other words, the other termination applications 308 may be sequenced prior to sequencing the hot-desk application 136. Therefore, when the communication server 120 receives the message from the hot-desk application 136, it is most likely that no further applications need to be sequenced by the communication server 120. Accordingly, the method continues with the communication server 120 forwarding the message to the access element 112 associated with the hot-desk endpoint 304 (step S305), which subsequently provides the message to the hot-desk endpoint 304 at which Bob is sitting and has registered with (step S306).

To further understand embodiments of the present disclosure, if the examples of FIGS. 2 and 3 were combined, then Alice would call Bob at (+19707654321) from hot-desk endpoint 204 (444-1234). After the message has been processed by hot-desk applications 136 for Alice and Bob, the message would ultimately reach Bob at the hot-desk endpoint 304 (555-6789) and it would appear to Bob and all other origination and termination applications 208, 308 as though Alice is actually calling from her direct-dial line (+13031234567). Furthermore, all of Alice's origination applications 208 and Bob's termination applications 308 will be sequenced even if Alice and Bob happen to be using hot-desk endpoints 204 and 304 that are hosted on the same access element 112.

Figure 4:
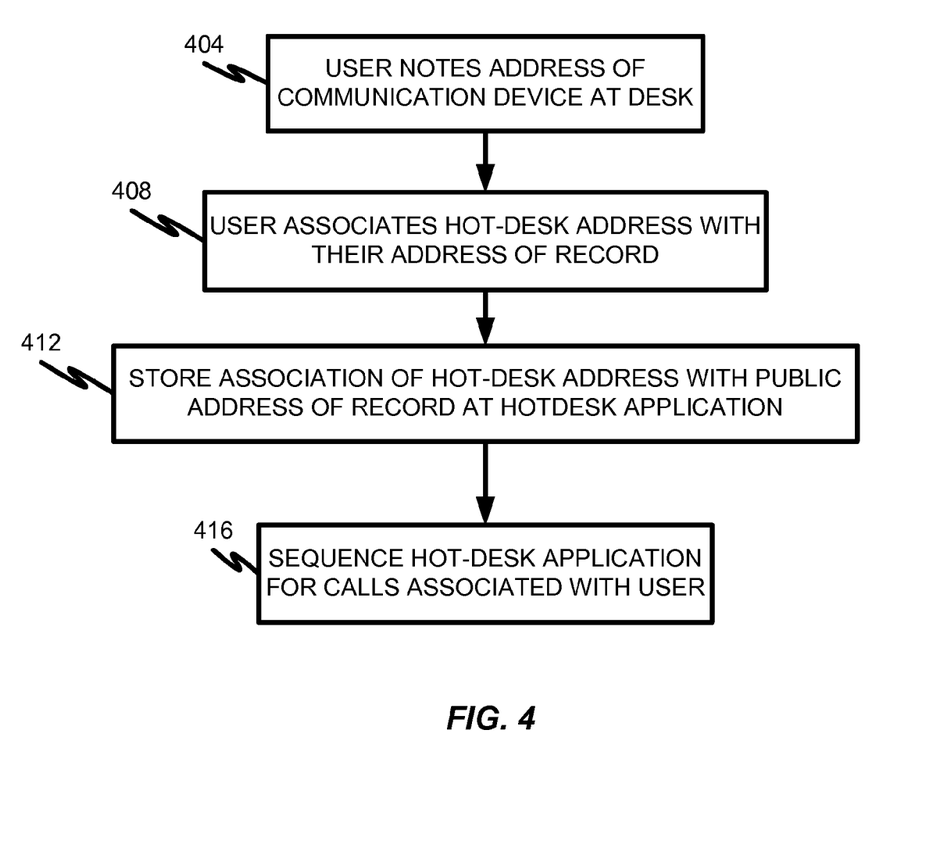
FIG. 4 is a flow diagram depicting a hot-desking method in accordance with embodiments of the present disclosure.

With reference now to FIG. 4, a method of hot-desking will be described in accordance with at least some embodiments of the present disclosure. The method is initiated when a user notes a hot-desk address of a communication device (e.g., a hot-desk endpoint) at a particular workstation or desk (step 404). The user then associates that hot-desk address with their AOR (step 408). In some embodiments, the user associates their hot-desk address with their AOR by performing a registration process. This registration process may occur via a web-based GUI or by implementing some sort of single sign on (SSO) process that is coupled with the user simply logging into the network 110 from the hot-desk endpoint. The registration process may also be accomplished via a TUI or the like.

The registration process causes the user's AOR to be stored with a logical association in the hot-desk application 136 or at some location that is accessible to the hot-desk application 136 (e.g., data store 152) (step 412). In some embodiments, the hot-desk application 136 maintains an internal record of the fact that the user associated their AOR with the hot-desk endpoint and specifically with the hot-desk number assigned to the hot-desk endpoint. By having this information available the hot-desking application 136 can easily invoke the hot-desking features discussed herein whenever the hot-desk application 136 is sequenced by the communication server 120 (step 416). As discussed above, the communication server 120 is configured to implicitly sequence the hot-desk application 136 for calls originating from the hot-desk endpoint and then sequence other applications for the user that is calling from the hot-desk endpoint. Likewise, the communication server 120 is configured to sequence the hot-desk application 136 for a called user that has been identified as sitting at or using a hot-desk endpoint.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving, by a processor, a first message, the first message comprising a hot-desk number associated with a hot-desk endpoint, wherein the first message is to initiate an outbound call and wherein the hot-desk endpoint is shared by a plurality of different users that comprise a calling user;
    determining, by the processor, that the hot-desk number has been associated with a calling user's address of record;
    in response to determining that the hot-desk number has been associated with the calling user's address of record, changing, by the processor, the hot-desk number to a non-hot-desk number associated with the calling user's address of record for the outbound call, wherein the non-hot desk number is only associated with the calling user; and
    in response to changing the hot-desk number with the calling user's address of record for the outbound call, the processor: looking up a communication preference for the calling user that identifies one or more applications and sequencing the one or more applications into a communication session of the first message.

2. The method of claim 1, wherein the non-hot-desk number corresponds to the calling user's address of record.

3. The method of claim 2, wherein the calling user's address of record is in one of an alphanumeric, E.164, or enterprise canonical numeric format.

4. The method of claim 1, wherein the hot-desk number is changed by altering one of a From, Contact, or P-Asserted-Identity (PAI) header value in the first message.

5. The method of claim 4, where the hot-desk number is changed by altering the From header value in the first message.

6. The method of claim 4, where the hot-desk number is changed by altering the P-Asserted-Identity (PAI) value in the first message.

7. The method of claim 1, wherein the one or more sequenced application is a plurality of sequenced applications that each use the user's address of record.

8. The method of claim 1, wherein the one or more sequenced application are sequenced into a media path of the communication session.

9. A method, comprising:
    receiving a first message, the first message comprising one of a To value or Request Uniform Resource Identifier (R-URI) that comprises a non-hot-desk number which is associated with an address of record for a called user;
    determining that the called user's address of record is also associated with a hot-desk number;
    in response to determining that the called user's address of record is associated with the hot-desk number, changing the one of the To value or R-URI to the hot-desk number; and
    sequencing one or more applications for the called user in accordance with the called user's communication preferences, wherein each of the one or more applications for the called user are sequenced before the one of the To value or R-URI of the first message is changed to the hot-desk number and wherein the one or more sequenced applications are sequenced into a media path associated with the first message.

10. The method of claim 9, wherein the non-hot-desk number corresponds to the called user's address of record.

11. The method of claim 10, wherein the called user's address of record is in one of an alphanumeric, E.164, or enterprise canonical numeric format.

12. The method of claim 9, wherein the first message is an INVITE message.

13. A non-transitory computer-readable medium comprising processor-executable instructions, the instructions comprising:
    instructions to receive a first message and determine that the first message is originated by a hot-desk endpoint, wherein the first message is to initiate an outbound call;
    instructions to route the first message to a hot-desk application in response to determining that the first message originated by the hot-desk;
    instructions to change a hot-desk number to a non-hot-desk number associated with a calling user's address of record for the outbound call, wherein the non-hot desk number is only associated with the calling user; and
    in response to changing the hot-desk number to the non-hot-desk number associated with the calling user's address of record for the outbound call: instructions to look up a communication preference for the calling user that identifies one or more applications and instructions to sequence the one or more applications into a communication session of the first message.

14. The computer-readable medium of claim 13, wherein the first message is an INVITE message.

15. The computer-readable medium of claim 13, wherein the first message is determined to be originated by the hot-desk endpoint by determining that the first message comprises an asserted identity value that equals the hot-desk number.

16. The computer-readable medium of claim 13, wherein the hot-desk application corresponds to one of a Back-to-Back User Agent or a proxy.

17. The computer-readable medium of claim 13, wherein the one or more sequenced application are sequenced into a media path of the communication session.

18. A communication system, comprising:
 a hot-desk application that facilitates operations of a hot-desk endpoint; and
 a communication server that:
  receives a first message, the first message comprising a hot-desk number associated with a hot desk endpoint, wherein the first message is to initiate an outbound call and wherein the hot-desk endpoint is shared by a plurality of different users that comprise a calling user;
  determines that the hot-desk number falls within a number range, wherein the number range comprises a plurality of numbers;
  sequences the hot-desk application in response to the hot-desk number falling within the number range;
  determines that the hot-desk number has been associated with a calling user's address of record;
  in response to determining that the hot-desk number has been associated with the calling user's address of record, changes the hot-desk number to a non-hot-desk number associated with the calling user's address of record for the outbound call, wherein the non-hot desk number is only associated with the calling user; and
  in response to changing the asserted identity of the hot-desk number to a non-hot-desk number associated with the calling user's address of record for the outbound call: looks up a communication preference for the calling user that identifies one or more applications and sequences the one or more applications into a communication session of the first message.

19. The system of claim 18, wherein the hot-desk application is sequenced as one of a Back-to-Back User Agent or a proxy.

20. The system of claim 18, wherein the one or more sequenced application are sequenced into a media path of the communication session.

\* \* \* \* \*